United States Patent [19]

Osipo et al.

[11] Patent Number: 5,271,874
[45] Date of Patent: Dec. 21, 1993

[54] METHOD FOR MOLDING A HYDROPHILIC CONTACT LENS

[75] Inventors: Clodia Osipo, Chicago; Richard Jahnke, Villa Park, both of Ill.

[73] Assignee: Wesley-Jessen Corporation, Chicago, Ill.

[21] Appl. No.: 971,423

[22] Filed: Nov. 4, 1992

[51] Int. Cl.$^5$ .............................................. B29D 11/00
[52] U.S. Cl. ..................................... 264/1.7; 264/2.2; 264/2.6
[58] Field of Search .......................... 264/1.7, 2.2, 2.6

[56] References Cited

U.S. PATENT DOCUMENTS

| | | | |
|---|---|---|---|
| 3,532,679 | 10/1970 | Steckler | 260/80.72 |
| 3,660,545 | 5/1972 | Wichterle | 264/2.6 |
| 3,948,841 | 4/1976 | Dusek | 260/29.6 TA |
| 4,035,330 | 7/1977 | Schultz | 264/2.6 |
| 4,173,606 | 11/1979 | Stoy et al. | 264/2.6 |
| 4,405,773 | 9/1983 | Loshaek et al. | 526/317 |
| 4,495,313 | 1/1985 | Larsen | 264/2.2 |
| 4,582,402 | 4/1986 | Knapp | 351/162 |
| 4,668,240 | 5/1987 | Loshaek | 8/507 |
| 4,680,336 | 7/1987 | Larsen et al. | 524/548 |
| 4,811,662 | 3/1989 | Sterman | 101/170 |
| 4,872,405 | 10/1989 | Sterman | 101/44 |
| 4,874,562 | 10/1989 | Hyon et al. | 264/2.6 |
| 4,889,664 | 12/1989 | Kindt-Larsen et al. | 264/2.6 |

OTHER PUBLICATIONS

Refojo, Journal of Polymer Science: Part A-1, vol. 5, 3103-3113 (1967).

*Primary Examiner*—James Lowe
*Attorney, Agent, or Firm*—Warrick E. Lee, Jr.

[57] ABSTRACT

A process for molding hydrophilic contact lenses comprising the steps of providing lens forming liquid comprising hydrophilic monomer mixed with solvent and polymerizing the liquid between two mold halves. The improvement comprises substantially removing the solvent by evaporation at temperature no higher than about 100 degrees C.

9 Claims, 1 Drawing Sheet

METHOD FOR MOLDING A HYDROPHILIC CONTACT LENS

BACKGROUND OF THE INVENTION

This invention relates to a process for molding a hydrophilic contact lens in a two part mold that simultaneously forms both the front and rear surfaces of the lens. The lens is produced by placing hydrophilic lens forming monomer in a first mold part, forming a contact lens shaped cavity by mating the first mold part with a second mold part, and polymerizing the monomer to form a contact lens in the cavity.

When molding a hydrophilic lens, lens forming monomer may be mixed with a solvent. This achieves several advantages. Use of solvent helps to produce lenses having reproducible size and shape. The use of solvent in the monomer mixture minimizes the shrinkage of the monomer mixture during polymerization, thereby improving lens quality. The solvent distributes heat more evenly during polymerization.

Polymerization solvents used in the past are typically organic liquids having relatively high boiling points, such as ethylene glycol (Refojo Journal of Polymer Science: Part A-1, Vol. 5,3103-3113 (1967)), compounds falling within a specific viscosity and R-Value range (Larsen, et al., U.S. Pat. No. 4,680,336) and boric acid esters of ethylene glycol (Kindt-Larsen, et al., U.S. Pat. No. 4,889,664). Other publications disclosing use of solvents for molding include U.S. Pat. Nos. 3,532,679; 3,660,545; and 3,948,841.

In the past removal of solvent from the molded polymer has been done by liquid-liquid extraction to replace the solvent with saline. This can be a tedious, expensive and time-consuming process

SUMMARY OF THE INVENTION

This invention is predicated upon the surprising discovery that a number of advantages are obtained by polymerizing a hydrophilic contact lens in a two part mold with a solvent and substantially removing the solvent by evaporation at temperature no higher than about 100 degrees C., more preferably no higher than about 85 degrees C. Of course, evaporation at a succession of different temperatures no higher than about 100 degrees (more preferably no higher than about 85 degrees) is included.

The term "substantially removing the solvent" is intended to mean removing at least about 80 weight percent of the solvent originally present in the lens forming liquid.

DETAILED DESCRIPTION OF THE INVENTION

Figure 1:
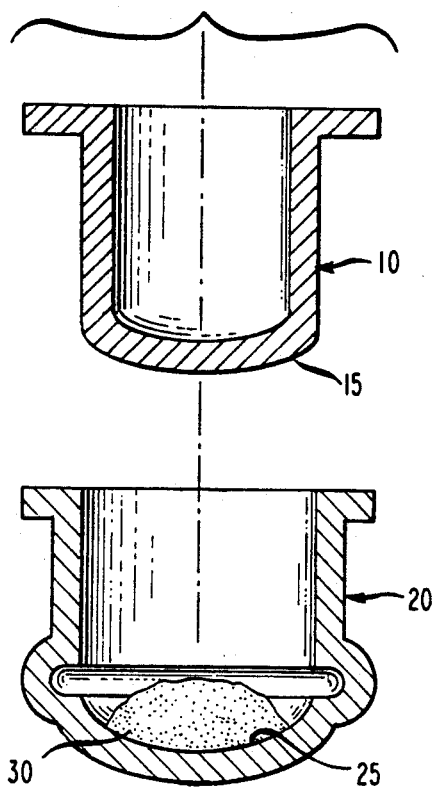
FIG. 1 illustrates two mold halves suitable for practicing the invention prior to mating.

The purpose of this invention is to mold both sides (convex and concave) of a contact lens with a single molding step. Numerous mold designs capable of two-sided lens molding have been known for many years, e.g., Shepherd U.S. Pat. No. 4,121,896. Hence the design of the molds used to practice this inventions is not critical and forms no part of this invention.

The composition of monomers used to form the lens is also not critical. Any combination of lens forming monomers capable of forming a hydrophilic polymer (i.e., one which forms a hydrogel upon exposure to aqueous saline solution) may be used. Typical hydrophilic lens forming monomers comprise hydroxyethyl methacrylate, N-vinyl-2-pyrrolidone, methacrylic acid, and many others well known in the art. Hydrophobic lens forming monomers may also be included in the lens-forming liquid, provided they are not present in quantities that cause the lens to be hydrophobic. Typical hydrophobic monomers for inclusion in the monomer mixture include methylmethacrylate, ethoxyethyl methacrylate, styrene, etc. A preferred lens forming mixture comprises a mixture of hydroxyethyl methacrylate, ethoxyethyl methacrylate, and methacrylic acid, as disclosed by Loshaek, et al., in U.S. Pat. No. 4,405,773.

The solvent added to the monomer mixture in accordance with this invention must dissolve the lens forming monomer of monomers, and preferably is miscible with water. Preferable the solvent has a boiling point of no higher than 100° C. Solvents having higher boiling points may be used, but evaporation at less than about 100 degrees C. will require use of vacuum or a longer evaporation time. The solvent is preferably $C_{1-5}$ straight, branched chain or cyclic monohydric alcohol; $C_{3-5}$ straight, branched chain or cyclic ketones; or $C_{3-5}$ cyclic ethers. The solvent is more preferably $C_{3-5}$ secondary or tertiary alcohol. The most preferred solvent is isopropanol. Among the keytones, the preferred solvent is acetone. Tetrahydrofuran as also an acceptable solvent.

Some water may be included in the solvent provided a clear gel is attained after cure of the lens. Although use of pure water produces a cloudy gel for most monomers, for monomer mixtures that do not become cloudy, pure water would be a suitable solvent. Other suitable solvent include cyclopentanone and dioxane.

When choosing a solvent, one should consider the maximum temperature the particular lens and mold materials can endure without degrading and whether it will be convenient to perform the evaporation under vacuum. With this information in mind, the Vapor Pressure vs. Temperature charts for various solvent candidates should make it easy to choose solvents for further experimentation Practice of the present invention achieves the following advantages:

1. Removing solvent after molding by evaporation is much easier than prior art extraction techniques. Removing ethylene glycol, e.g., by repeated contact with saline is a tedious and costly process.

2. Removal of the solvent by evaporation makes the lens easier to handle for further manufacturing steps, such as, removal of the lens from the mold half to which the lens adheres and transfer to the final container.

3. If a colored contact lens is to be formed, printing the dried lens produces a lens with better cosmetic appearance.

4. If the solvent is a ketone, a secondary alcohol, a tertiary alcohol, or other compound not having a reactive group, residual solvent is not likely to react with any reactive groups in the ink.

FIG. 1 shows mold halves that may be used for practicing the invention. Of course the invention is not limited to the mold-halves design shown in FIG. 1, but any molding apparatus for simultaneously forming both sides of a contact lens may be used. In FIG. 1, first mold half 10 has convex lens molding surface 15. Second mold half 20 has concave lens molding surface 25. Contact lens forming liquid 30 comprising hydrophilic monomer mixed with solvent in accordance with this invention is deposited on concave surface 25.

Figure 2:
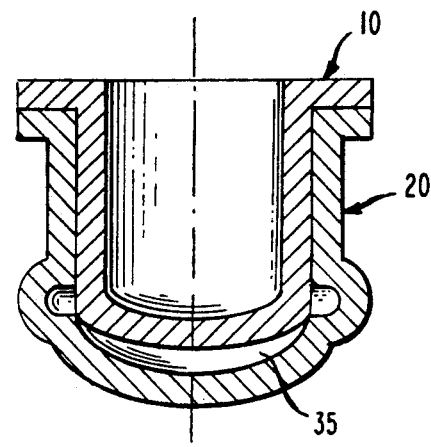
FIG. 2 illustrates the fold halves of FIG. 1 mated to form a contact-lens-shaped cavity.

Mold halves 10 and 20 are then mated as shown in FIG. 2 to form contact-lens-shaped cavity 35 filled with contact lens forming liquid. While the molds are closed, the lens forming liquid is cured (polymerized) to convert the liquid to a contact lens solvated with the solvent initially present in the lens forming liquid.

The method of cure is not critical to practice of this invention. Cure can take place by a variety of mechanisms depending on the composition of the lens forming mixture and any catalyst present therein. Cure by heat, U.V. light, microwave, etc. and combinations thereof is all in accordance with this invention.

Figure 3:
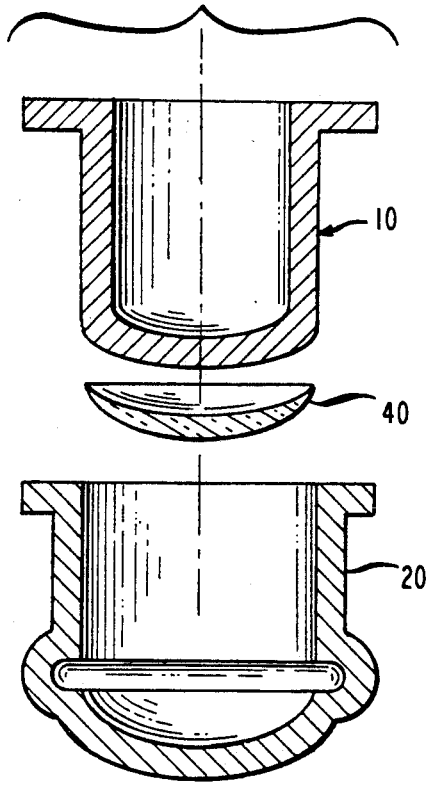
FIG. 3 illustrates the mold halves of FIG. 2 opened and the contact lens formed by the process.

After cure, the mold halves are separated as shown in FIG. 3 to obtain contact lens 40. Contact lens 40 usually adheres to one of the lens molding surfaces. Solvent is than substantially removed from the lens by evaporation at temperature no higher than about 100 degrees C., more preferably no higher than about 85 degrees C. If preferred, low-boiling solvents are used, evaporation can take place at atmospheric pressure. Preferably the completed lens, which may be attached to one of the mold halves, is placed in an oven and the temperature gradually raised to about 85° C. For highly volatile solvents, such as isopropanol and acetone, air drying at room temperature may suffice to remove much of the solvent. Of course, for very volatile solvents, cure temperature should be minimized to prevent the solvent's escaping from the contact-lens-shaped cavity.

If the solvent has a high atmospheric boiling point, e.g. in excess of about 100° C., then the evaporation is carried out under sufficient vacuum to lower the solvent's boiling point to less than 100° C., more preferably less than about 85 degrees C.

If further processing is not desired or necessary, the substantially solvent-free lens can then be removed from the mold half, e.g. by crimping the mold half, hydrated with saline, packaged, sterilized, and shipped to the customer. Of course such hydration and packaging steps are well known in the art.

However, if further processing of the lens is desirable or necessary, it can easily be accomplished on the substantially solvent-free lens. For example, color printing, polishing, or edge finishing is easily accomplished on the dry lens. Furthermore, after immersion of the substantially dry lens in saline, it may be easily inspected. Also this immersion for inspection removes still more of the solvent.

A preferred further processing step is color deposition. This can be accomplished using the pad printing process of Knapp's U.S. Pat. No. 4,582,402. With Knapp's process an iris pattern is formed on a plate having depressions for the colorant. Next a pad constructed, e.g., of silicon rubber is pressed against the plate, transferring the ink to the pad. Finally the pad is pressed against a surface of the lens to be colored, transferring the colorant to the lens surface in the pattern that was on the plate.

Figure 4:
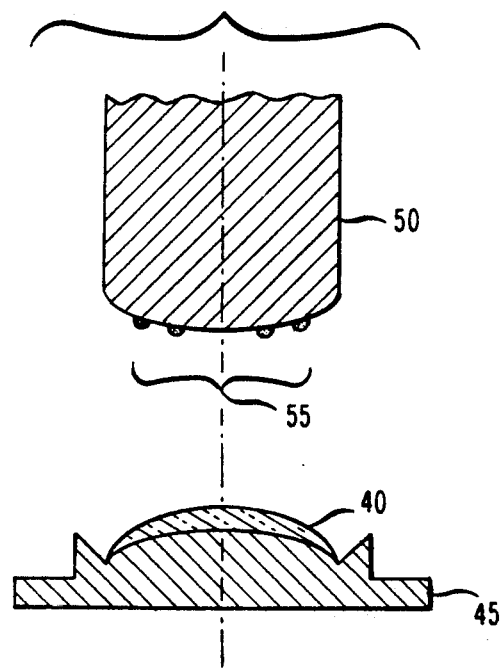
FIG. 4 illustrates the application of colorant to a contact lens formed in accordance with this invention.

FIG. 4 illustrates the last step of the pad printing process. Lens 40 has been placed on holder 45. Pad 50 having colorant pattern 55 is shown in position above the lens. By pressing pad 50 against the lens, pattern 55 will be transferred to the lens.

Preferred colorant compositions are shown in Loshaek's U.S. Pat. No. 4,668,240. In accordance with a preferred embodiment the polymer forming the lens has at least one of the functional groups, —OH, —COOH, or —NH—R, wherein R is $C_{1-8}$ alkyl. The colorant comprises pigment, binding polymer having the same functional groups and a compound having at least two groups per molecule of —NCO or epoxy.

Major advantages of using solvents in accordance with this invention when coloring a lens with colorant containing —NCO or epoxy groups are:

1. Once the solvent is removed by evaporation, little, if any, solvent remains on the lens to react with the —NCO and epoxy groups.

2. Even if small amounts of residual solvent remain, if a preferred solvent is used, it will not readily react with the —NCO and epoxy groups. Compare ethylene glycol having two highly reactive primary —OH groups with acetone which has no reactive groups and isopropanol which has only one —OH group having minor reactivity because it is a secondary —OH group.

3. The print quality is improved when the lens surface is substantially dry, i.e. there is no excessive smearing of the applied ink pattern.

EXAMPLES

The following examples are intended to illustrate but not limit the scope of the invention, which is defined by the appended claims.

The following abbreviations are used in these examples:

HEMA-hydroxy ethyl methacrylate
EOEMA-ethoxy ethyl methacrylate
MAA-methacrylic acid
APM-mixture containing 93.02 wt % HEMA and 6.98 wt % phthalocyanine green
EDMA-ethylene glycol dimethacrylate
VAZO-64-azobisiiobutyronitrile
BME-Benzoin Methyl Ether
IPA-isopropyl alcohol
THF-tetrahydro furan
MERCAP-2-mercapto ethanol
C'PENTANONE-cyclopentanone
MEHQ-methyl ether hydroquinone EXAMPLE 1: (isopropyl alcohol as solvent)

A formulation is selected from Table 1 and pipetted into the concave mold half. The two mold halves are then joined. The liquid is polymerized by any appropriate method but preferably by first prepolymerizing under ultraviolet lights, and then completing the lens by a thermal cure at 70 degrees C. for two hours.

After cure, the mold halves are opened and processed in one of several ways to obtain a finished contact lens. The preferred method is evaporation of the solvent IPA. About 30 minutes after opening the mold halves and holding the lens at room temperature, approximately 55 percent of the IPA evaporates, leaving a lens that is substantially dry to the touch. Thereafter the lens is heated at 85° C. for 45 minutes to remove the remainder of the solvent. The lens is then removed from the mold half by crimping the mold half. The lens is then immersed in normal saline in an inspection cup and inspected. Thereafter the lens is transferred to a package containing fresh normal saline.

TABLE 1

| INGREDIENTS | WT % 1a | WT % 1b |
|---|---|---|
| HEMA | 47.894 | 47.824 |
| EOEMA | 5.330 | 5.330 |
| MAA | 0.644 | 0.640 |
| APM* | 0.000 | 0.070 |
| EDMA | 0.830 | 0.830 |
| VAZO-64 | 0.300 | 0.300 |
| BME | 0.005 | 0.005 |
| IPA | 45.000 | 45.000 |

Formula 1a produces a clear lens, and formula 2a produces a lens having a very light tint to render it visible for easier handling.

EXAMPLE 2: (cyclopentanone as solvent)

The formulation given in table 2 was prepared and used to fill molds of the type described in example 1. The molds were placed in an oven at 80 deg C. for 1 hour. The molds were opened to reveal the lens. The solvent was removed from the lens by evaporation at 85° C. for 2 hours at atmospheric pressure. The lens was removed from the mold and placed in saline.

TABLE 2

| INGREDIENTS | WT % |
|---|---|
| HEMA | 38.98 |
| EOEMA | 4.33 |
| MAA | 0.52 |
| EDMA | 0.67 |
| VAZO-64 | 0.50 |
| CYCLOPENTANONE | 55.00 |

EXAMPLE 3: (acetone as solvent)

The formulation given in table 3 was prepared and used to fill molds of the type described in example 1. The molds were placed under ultraviolet light until a lens formed. The mold was then opened and the solvent was evaporated for 2 hours at 85° C. The lens was then removed from the mold and placed in saline.

TABLE 3

| INGREDIENTS | WT % |
|---|---|
| HEMA | 39.25 |
| EOEMA | 4.36 |
| MAA | 0.52 |
| EDMA | 0.67 |
| BME | 0.20 |
| ACETONE | 55.00 |

EXAMPLE 4: (acetone as solvent)

The formulation given in table 4 was prepared and used to fill molds of the type described in example 1. The molds were placed in an oven at 80 deg. C. for one hour. The mold was then opened and the solvent was removed from the lens by evaporation for 2 hours at 85° C. The lens was then removed from the mold half and placed in saline.

TABLE 4

| INGREDIENTS | WT % |
|---|---|
| HEMA | 38.98 |
| EOEMA | 4.33 |
| MAA | 0.52 |
| EDMA | 0.67 |
| VAZO-64 | 0.50 |

TABLE 4-continued

| INGREDIENTS | WT % |
|---|---|
| ACETONE | 55.00 |

EXAMPLE 5: (THF as solvent)

The formulation given in table 5 was prepared and used to fill molds of the type described in example 1. The molds were placed in an oven at 80 deg. C. for one hour. The mold was opened and the solvent was removed by evaporation at 85° C. for 2 hours. The lens was removed from the mold half and placed into saline.

TABLE 5

| INGREDIENTS | WT % |
|---|---|
| HEMA | 38.98 |
| EOEMA | 4.36 |
| MAA | 0.52 |
| EDMA | 0.67 |
| VAZO-64 | 0.50 |
| THF | 55.00 |

EXAMPLE 6: (printed lens)

A lens was formed as described in example 1 using the clear monomer formulation given in table 1. A printing ink was obtained which conformed to those described in Loshaek's U.S. Pat. No. 4,668,240. The lens was then printed as described in Knapp's U.S. Pat. No. 4,704,017. The lens was cured (85 deg C., 45 min) and placed into saline.

EXAMPLE 7: (70/30, IPA/Water Solvent)

The formulation given in Table 7 was used to fill molds of the type described in example 1. The filled molds were exposed to U.V. light for three hours. The mold halves were separated and the solvent was removed by evaporating for 2 hours at 85° C. The lens was removed from the mold half and placed in saline.

TABLE 7

| INGREDIENTS | WT % |
|---|---|
| HEMA | 48 |
| EOEMA | 5.33 |
| MAA | 0.84 |
| EDMA | 0.83 |
| BME | 0.20 |
| IPA | 31.5 |
| WATER | 13.5 |

EXAMPLE 8: (Solvent Evaporation Rates)

Lenses were produced with the formula of example 1. Measurements of the amount of IPA in the lens after opening the mold halves and subjecting the lenses to various treatments are shown in table 8.

TABLE 8

| Treatment | Ave μg IPA/Lens | % IPA/Lens |
|---|---|---|
| Step 1: UV Cure only | 12616 | 42.05 |
| Step 2: Step 1 + 2 hr. at 70° C. | 11446 | 38.15 |
| Step 3: Step 2 + 1 hr. at 25° C. | 4596 | 15.32 |
| UV Cure and Postcure 2 hr. at 70° C. with mold halves closed + 45 min. at 85° C. | 1738 | 5.79 |

EXAMPLE 9: (Room Temperature Evaporation Rates)

Lenses were cast in tared molds by filling the molds with the formulation in Table 9A.

TABLE 9A

| INGREDIENTS | WT % |
| --- | --- |
| HEMA | 48 |
| EOEMA | 5.33 |
| MAA | 0.64 |
| EDMA | 0.83 |
| BME | 0.2 |
| IPA | 45 |

The lenses were cured with UV light. The cured lens was reweighed and the lens weight at time zero calculated. The mold halves were separated and allowed to stand at room temperature and atmospheric pressure. The mold halves and lenses were reweighed 5, 10, 20, and 30 minutes after separation.

The amount of solvent lens was calculated and appears in Table 9B.

TABLE 9B

| TIME (Minutes) | WT LOSS, % OF SOLVENT |
| --- | --- |
| 0 | 0 |
| 5 | 21.38 |
| 10 | 32.49 |
| 20 | 46.44 |
| 30 | 54.53 |

It can be seen that the present invention achieves the highly reproducible results attainable with solvent molding, yet substantially eliminates the high cost of solvent extraction. Moreover the invention also provides a substantially dry lens that may be conveniently printed with colorant and subjected to other processes that are best performed on a substantially dry lens.

We claim

1. In a process for molding a hydrophilic contact lens comprising the steps of providing a lens forming liquid comprising hydrophilic monomer mixed with solvent; providing a first mold half having a convex lens molding surface and a second mold half having a concave lens molding surface; depositing the lens forming material on the concave lens molding surface; mating the mold halves to form a contact-lens-shaped cavity filled with contact lens forming liquid; and curing the lens-forming liquid to form a contact lens in the contact-lens-shaped cavity, wherein the improvement comprises:

separating the mold halves and substantially removing the solvent from the lens by evaporation at temperature no higher than about 100 degrees C.

2. The process of claim 1 wherein the evaporation temperature is no higher than about 85 degrees C.

3. The process of claim 1 wherein the solvent is selected from the group consisting of $C_{1-5}$ straight, branched chain or cyclic monohydric alcohols; $C_{3-5}$ straight, branched chain or cyclic ketones and $C_{3-5}$ cyclic ethers.

4. The process of claim 3 wherein said solvent is $C_{3-5}$ secondary or tertiary alcohol.

5. The process of claim 4 wherein said solvent is isopropanol.

6. The process of any one of claims 1 to 5 followed by the step of applying colorant to a surface of the lens.

7. The process of claim 6 wherein said colorant comprises at least one compound having at least one functional group selected from —NCO and epoxy.

8. The process of claim 6 wherein said colorant contains a compound having at least two —NCO groups.

9. The process of any one of claims 1 to 5 wherein the evaporation is performed under vacuum.

* * * * *